US012671152B2

(12) United States Patent
Revels et al.

(10) Patent No.: US 12,671,152 B2
(45) Date of Patent: Jun. 30, 2026

(54) CELL STACK-TO-CELL STACK CONNECTIONS FOR TRACTION BATTERY PACKS

(71) Applicant: FORD GLOBAL TECHNOLOGIES, LLC, Dearborn, MI (US)

(72) Inventors: Alex Revels, Canton, MI (US); Brock Dunlap, Dearborn, MI (US); Deanna Marie Winton Hoffman, Ann Arbor, MI (US); Michael E. Reibling, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 613 days.

(21) Appl. No.: 18/176,762

(22) Filed: Mar. 1, 2023

(65) Prior Publication Data

US 2024/0079738 A1     Mar. 7, 2024

Related U.S. Application Data

(60) Provisional application No. 63/403,445, filed on Sep. 2, 2022.

(51) Int. Cl.
| | |
|---|---|
| *H01M 50/547* | (2021.01) |
| *H01M 50/342* | (2021.01) |
| *H01M 50/505* | (2021.01) |
| *H01M 50/566* | (2021.01) |
| *H01M 50/567* | (2021.01) |

(52) U.S. Cl.
CPC ....... *H01M 50/547* (2021.01); *H01M 50/342* (2021.01); *H01M 50/505* (2021.01); *H01M*

*50/566* (2021.01); *H01M 50/567* (2021.01); *H01M 2220/20* (2013.01)

(58) Field of Classification Search
CPC ............. H01M 50/547; H01M 50/342; H01M 50/505; H01M 50/566; H01M 50/567; H01M 2220/20; H01M 50/209; H01M 50/211; H01M 50/296; H01M 50/503; H01M 50/507; Y02E 60/10
USPC ........................................................ 429/122
See application file for complete search history.

(56) References Cited

U.S. PATENT DOCUMENTS

| | | | |
|---|---|---|---|
| 9,478,779 B2 | 10/2016 | Burkman | |
| 10,122,004 B2 | 11/2018 | De Souza et al. | |
| 10,389,047 B2 | 8/2019 | Fees et al. | |
| 11,387,608 B2 | 7/2022 | Savicki, Jr. et al. | |
| 2014/0234677 A1* | 8/2014 | Yoon ................... | H01M 50/308 429/89 |
| 2020/0212381 A1* | 7/2020 | Dietze ................. | H01M 50/227 |
| 2022/0200101 A1 | 6/2022 | Lee et al. | |

(Continued)

*Primary Examiner* — Christian Roldan
(74) *Attorney, Agent, or Firm* — David B. Kelley; Carlson, Gaskey & Olds, P.C.

(57) ABSTRACT

Electrical connection systems are provided for electrically connecting cell stacks of a traction battery pack. Exemplary electrical connections systems may include a first high voltage terminal of a first cell stack and a second high voltage terminal of a second cell stack. The first high voltage terminal may be mounted to a first cross-member beam of the first cell stack, and the second high voltage terminal may be mounted to a second cross-member beam of the second cell stack. The first high voltage terminal may be arranged and coupled to the second high voltage terminal to electrically connect the first cell stack and the second cell stack.

20 Claims, 6 Drawing Sheets

(56)     References Cited

U.S. PATENT DOCUMENTS

2022/0238950  A1      7/2022  Roberts et al.
2023/0143369  A1*     5/2023  Yano ................... H01M 50/519
                                                                       180/68.5

* cited by examiner

CELL STACK-TO-CELL STACK CONNECTIONS FOR TRACTION BATTERY PACKS

CROSS-REFERENCE TO RELATED APPLICATIONS

This disclosure claims priority to U.S. Provisional Application No. 63/403,445, which was filed on Sep. 2, 2022 and is incorporated herein by reference.

TECHNICAL FIELD

This disclosure relates generally to traction battery packs, and more particularly to systems and methods for electrically connecting cell stacks of traction battery packs.

BACKGROUND

Electrified vehicles include a traction battery pack for powering electric machines and other electrical loads of the vehicle. The traction battery pack includes a plurality of battery cells and various other battery internal components that support electric vehicle propulsion.

SUMMARY

A traction battery pack according to an exemplary aspect of the present disclosure includes, among other things, a first cell stack including a first cross-member beam, a first high voltage terminal mounted to the first cross-member beam, a second cell stack including a second cross-member beam, and a second high voltage terminal mounted to the second cross-member beam. The first high voltage terminal is coupled to the second high voltage terminal to electrically connect the first cell stack and the second cell stack.

In a further non-limiting embodiment of the foregoing traction battery pack, a mechanical fastener couples the first high voltage terminal to the second high voltage terminal.

In a further non-limiting embodiment of either of the foregoing traction battery packs, the first high voltage terminal includes a first electrical contact portion and the second high voltage terminal includes a second electrical contact portion arranged side-by-side to the first electrical contact portion along a vertical axis. The mechanical fastener extends along the vertical axis to couple the first high voltage terminal to the second high voltage terminal.

In a further non-limiting embodiment of any of the foregoing traction battery packs, the first high voltage terminal includes a first electrical contact portion and the second high voltage terminal includes a second electrical contact portion arranged side-by-side to the first electrical contact portion along a horizontal axis. The mechanical fastener extends along the horizontal axis to couple the first high voltage terminal to the second high voltage terminal.

In a further non-limiting embodiment of any of the foregoing traction battery packs, a weld bead couples the first high voltage terminal to the second high voltage terminal.

In a further non-limiting embodiment of any of the foregoing traction battery packs, a bus bar couples the first high voltage terminal to the second high voltage terminal.

In a further non-limiting embodiment of any of the foregoing traction battery packs, the first high voltage terminal includes a male portion configured to engage a female portion of the second high voltage terminal to electrically connect the first cell stack and the second cell stack.

In a further non-limiting embodiment of any of the foregoing traction battery packs, the female portion includes a first arm, a second arm, and a slot extending between the first arm and the second arm. The male portion is received within the slot to electrically connect the first cell stack and the second cell stack.

In a further non-limiting embodiment of any of the foregoing traction battery packs, the first cross-member beam and the second cross-member beam establish a cross-member assembly arranged between the first cell stack and the second cell stack of the traction battery pack.

In a further non-limiting embodiment of any of the foregoing traction battery packs, a venting passageway is disposed between the first cross-member beam and the second cross-member beam.

In a further non-limiting embodiment of any of the foregoing traction battery packs, an enclosure cover provides a vertically upper side of the venting passageway, and an enclosure tray or a heat exchanger plate provides a vertically lower side of the venting passageway.

In a further non-limiting embodiment of any of the foregoing traction battery packs, a vent opening is formed through the first cross-member beam establishes a venting path between the first cell stack and the venting passageway.

In a further non-limiting embodiment of any of the foregoing traction battery packs, the first cell stack includes a plurality of battery cells supported between the first cross-member beam and a third cross-member beam, and the second cell stack includes another plurality of battery cells supported between the second cross-member beam and a fourth cross-member beam.

In a further non-limiting embodiment of any of the foregoing traction battery packs, the first high voltage terminal includes a base portion mounted to the first cross-member beam and an electrical contact portion that extends at a transverse angle away from the base portion.

In a further non-limiting embodiment of any of the foregoing traction battery packs, the first high voltage terminal includes a first electrical contact portion having a first aperture, and the second high voltage terminal includes a second electrical contact portion having a second aperture that is coaxially aligned with the first aperture.

A traction battery pack according to another exemplary aspect of the present disclosure includes, among other things, a first cell stack, a second cell stack, a cross-member assembly arranged between the first cell stack and the second cell stack, and an electrical connection system for electrically connecting the first cell stack and the second cell stack. The electrical connection system includes a first high voltage terminal of the first cell stack, a second high voltage terminal of the second cell stack, and a mechanical fastener that joins the first high voltage terminal to the second high voltage terminal.

In a further non-limiting embodiment of the foregoing traction battery pack, the mechanical fastener includes a weld bead.

In a further non-limiting embodiment of either of the foregoing traction battery packs, the weld bead joins a bus bar to the first high voltage terminal and the second high voltage terminal.

In a further non-limiting embodiment of any of the foregoing traction battery packs, the mechanical fastener includes a bolt and nut assembly.

In a further non-limiting embodiment of any of the foregoing traction battery packs, the first high voltage terminal is mounted to a first cross-member beam of the cross-member assembly, and the second high voltage terminal is mounted to a second cross-member beam of the cross-member assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrical connection systems for electrically connecting cell stacks of a traction battery pack. Exemplary electrical connections systems may include a first high voltage terminal of a first cell stack and a second high voltage terminal of a second cell stack. The first high voltage terminal may be mounted to a first cross-member beam of the first cell stack, and the second high voltage terminal may be mounted to a second cross-member beam of the second cell stack. The first high voltage terminal may be arranged coupled to the second high voltage terminal to electrically connect the first cell stack and the second cell stack. These and other features are discussed in greater detail in the following paragraphs of this detailed description.

Figure 1:
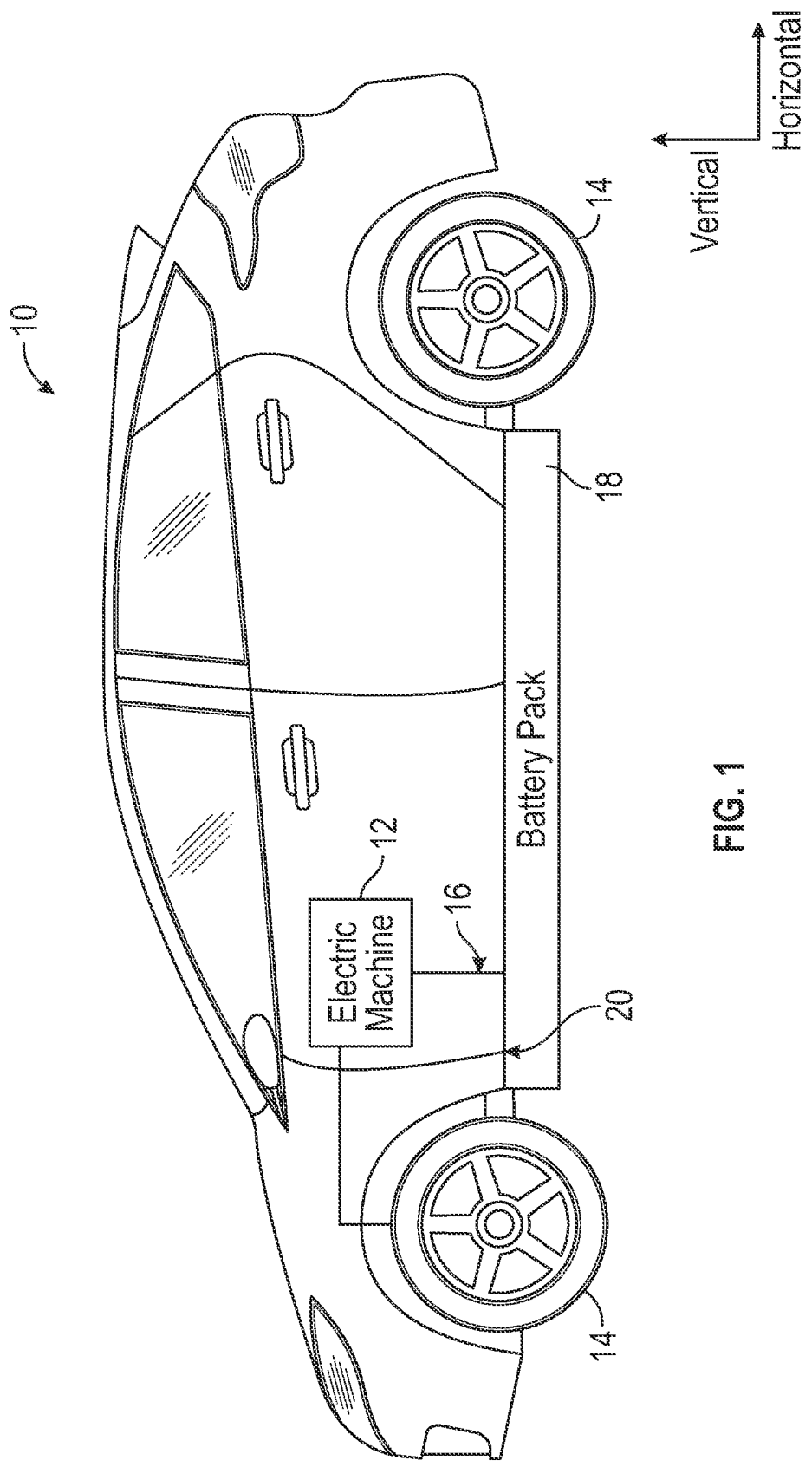
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack assembly that includes a plurality of battery cells capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be secured to an underbody 20 of the electrified vehicle 10. However, the traction battery pack 18 could be located elsewhere on the electrified vehicle 10 within the scope of this disclosure.

Figure 2:
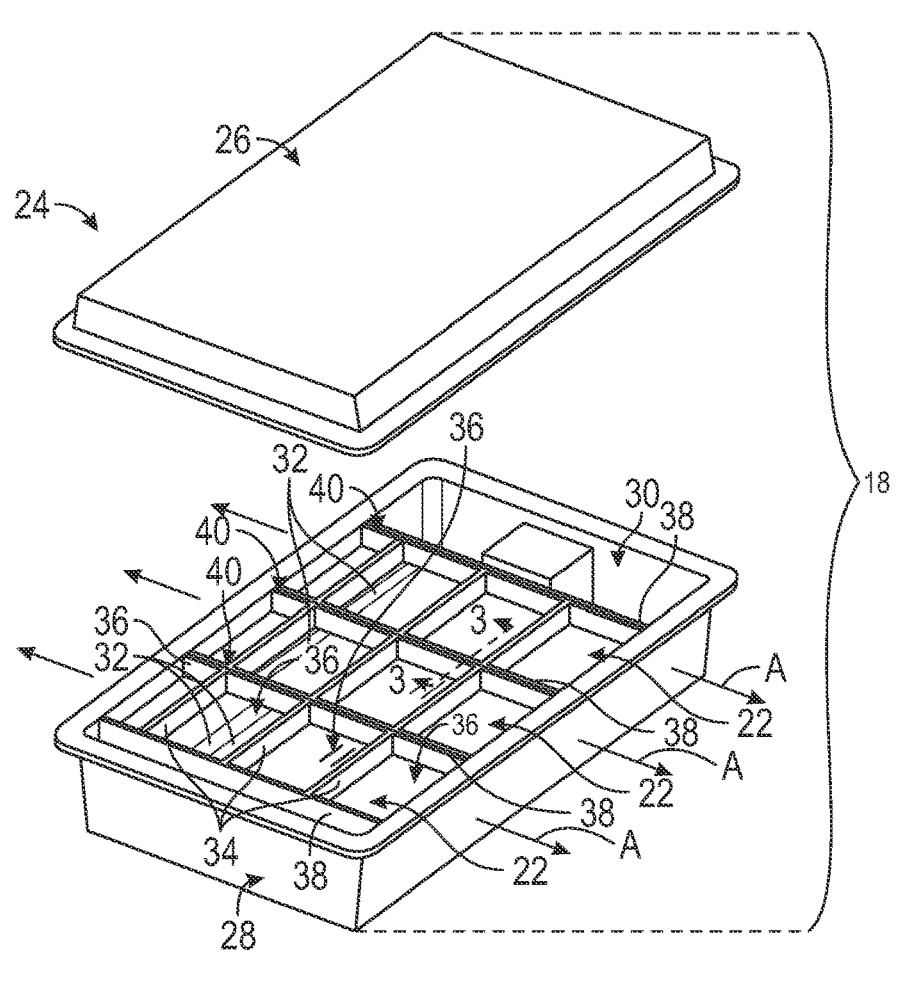
FIG. 2 is an exploded perspective view of a traction battery pack for an electrified vehicle.
Figure 3:
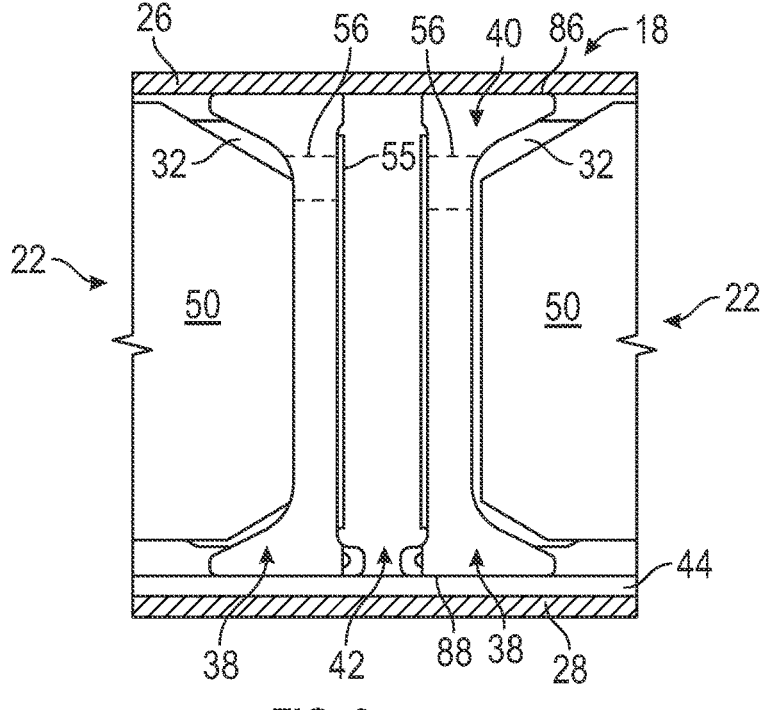
FIG. 3 is a cross-sectional view through section 3-3 of FIG. 2.

FIGS. 2 and 3 further illustrates details associated with the traction battery pack 18 of the electrified vehicle 10. The traction battery pack 18 may include a plurality of cell stacks 22 housed within an interior area 30 of an enclosure assembly 24. The enclosure assembly 24 of the traction battery pack 18 may include an enclosure cover 26 and an enclosure tray 28. The enclosure cover 26 may be secured (e.g., bolted, welded, adhered, etc.) to the enclosure tray 28 to provide the interior area 30 for housing the cell stacks 22 and other battery internal components of the traction battery pack 18.

Each cell stack 22 may include a plurality of battery cells 32. The battery cells 32 of each cell stack 22 may be stacked side-by-side relative to one another along a cell stack axis A. The battery cells 32 store and supply electrical power for powering various components of the electrified vehicle 10. Although a specific number of cell stacks 22 and battery cells 32 are illustrated in the various figures of this disclosure, the traction battery pack 18 could include any number of the cell stacks 22, with each cell stack 22 having any number of individual battery cells 32.

In an embodiment, the battery cells 32 are lithium-ion pouch cells. However, battery cells having other geometries (cylindrical, prismatic, etc.) and/or chemistries (nickel-metal hydride, lead-acid, etc.) could alternatively be utilized within the scope of this disclosure.

One or more structural thermal barriers 34 may be arranged along the respective cell stack axis A of each cell stack 22. The structural thermal barriers 34 may compartmentalize each cell stack 22 into two or more groupings or compartments 36 of battery cells 32. Each compartment 36 may hold one or more of the battery cells 32 within one of the cell stacks 22. In an embodiment, the battery cells 32 of each cell stack 22 are held within one of four compartments 36. However, other configurations, including configurations that utilize a greater or fewer number of compartments 36, could be used within the scope of this disclosure.

The battery cells 32 of each cell stack 22 may be arranged between a pair of cross-member beams 38. The cross-member beams 38 may be configured to hold the battery cells 32 and at least partially delineate the cell stacks 22.

The cross-member beams 38 may be adhesively secured to the enclosure cover 26 and to either the enclosure tray 28 or to a heat exchanger plate 44 positioned between the enclosure tray 28 and one or more cell stacks 22. The adhesive can seal these interfaces to inhibit battery cell vent byproducts escaping through these areas.

Immediately adjacent-cross member beams 38 may established a cross-member assembly 40 disposed between adjacent cell stacks 22 of the traction battery pack 18. The cross-member assemblies 40 may be configured to transfer a load applied to a side of the electrified vehicle 10, for example. Each cross-member beam 38 of the cross-member assemblies 40 may be a structural beam that can help accommodate tension loads from battery cell 32 expansion and compression loads. The cross-member assemblies 40 are therefore configured to increase the structural integrity of the traction battery pack 18.

The cross-member assembles 40 may also establish a battery pack venting system for communicating battery cell vent byproducts from the traction battery pack 18 during a battery thermal event. For example, the cross-member assemblies 40 may establish passageways 42 (best shown in FIG. 3) that communicate the battery cell vent byproducts from the cell stacks 22 toward a position where the battery cell vent byproducts can be expelled from the traction battery pack 18.

In the exemplary embodiment illustrated in FIG. 3, first and second adjacent cross-member beams 38 may establish a first side and a second side, respectively, of the passageway 42 of the cross-member assembly 40. Further, a vertically upper side of the passageway 42 may be established by the enclosure cover 26, and a vertically lower side of the passageway 42 may be established by a heat exchanger plate 44 positioned against the enclosure tray 28. In another embodiment, the heat exchanger plate 44 may be omitted and the vertically lower side of the passageway 42 may be established by the enclosure tray 28. Vertical and horizontal, for purposes of this disclosure, are with reference to ground and a general orientation of traction battery pack 18 when installed within the electrified vehicle 10 of FIG. 1.

In an embodiment, the cell stacks 22, the cross-member assemblies 40, and the respective passageways 42 extend longitudinally in a cross-vehicle direction. However, other configurations are further contemplated within the scope of this disclosure.

Figure 4:
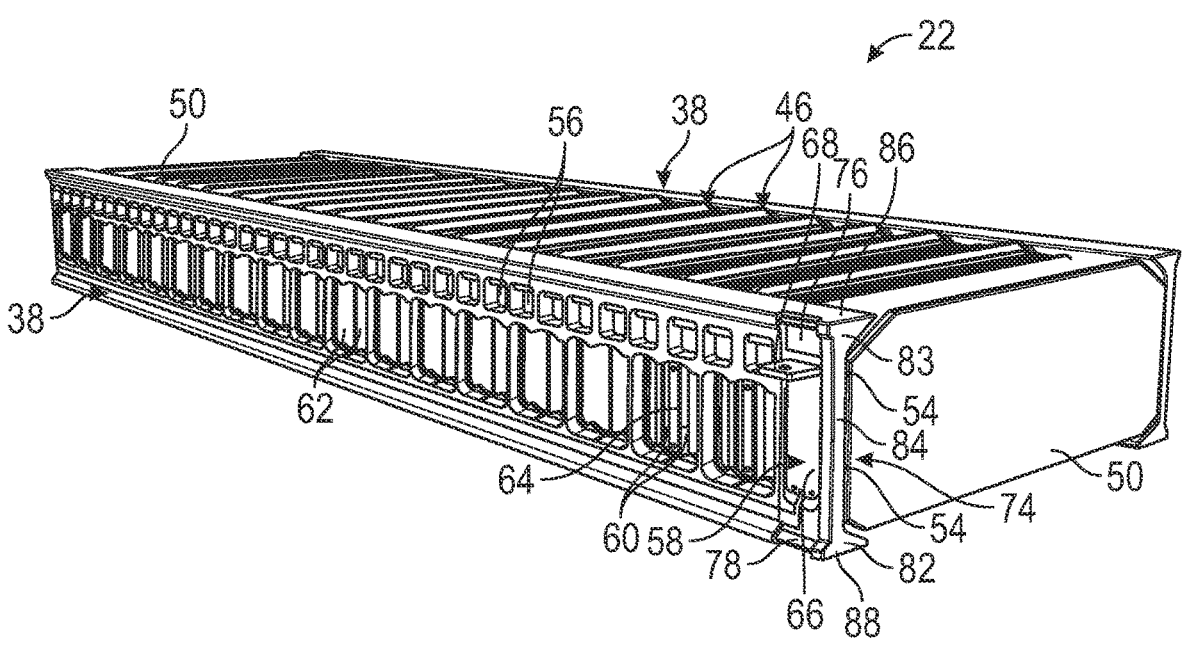
FIG. 4 illustrates an exemplary cell stack of the traction battery pack of FIGS. 2 and 3.

FIG. 4, with continued reference to FIGS. 2 and 3, illustrates an exemplary cell stack 22 of the traction battery pack 18. Additional cell stacks 22 of the traction battery pack 18 could include an identical design to the cell stack 22 shown in FIG. 4 or a similar design as its electrical connections with neighboring cell stacks can vary in order to complete a necessary electrical circuit as would be appreciated by a person on ordinary skill in the art having the benefit of this disclosure.

The cell stack 22 may include a plurality of cell packets 46 stacked horizontally between a pair of cross-member beams 38 and longitudinally (e.g., side-by-side along the cell stack axis A) between a pair of compression plates 50.

The total number of cell packets 46 provided within the cell stack 22 may vary and is therefore not intended to limit this disclosure.

Each compression plate 50 may be made of a plastic material. The compression plates 50 may be configured to accommodate and maintain compression of the cell stack 22 along the cell stack axis A. The compression plates 50 may be attached to the cross-member beams 38. In an embodiment, the compression plates 50 include tabs 54 that are received by the cross-member beams 38.

Each cell packet 46 of the cell stack 22 may include a combination of battery cells 32, one or more structural thermal barriers 34, and one or more cell expansion pads 48 that are stacked together along the cell stack axis A. An exemplary stacking configuration of each cell packet 46 may include the following arrangement of subcomponents: battery cell 32—battery cell 32—cell expansion pad 48—structural thermal barrier 34—cell expansion pad 48—battery cell 32—battery cell 32—cell expansion pad 48. However, the cell packets 46 could embody various other stacking arrangements/configurations within the scope of this disclosure.

The various subcomponents of each cell packet 46 may be secured together using an adhesive, such as strips of two-sided adhesive tape 52, for example. The strips of the two-sided adhesive tape 52 may be interspersed between each adjacent pair of subcomponents of the cell packet 46.

The structural thermal barriers 34 may each include a single-piece structure or a multi-layered sandwich structure that is configured to slow or even prevent thermal propagation from cell packet-to-cell packet across the cell stack 22. In an embodiment, the structural thermal barriers 34 may be made of a metallic material, such as stainless steel or aluminum, or a thermoplastic material, for example. In another embodiment, the structural thermal barriers 34 include an insulating material(s), such as aerogel materials or foam materials. However, other material or combinations of materials could with utilized to provide the structural thermal barriers 34 with insulative properties within the scope of this disclosure.

The cell expansion pads 48 may include a compliant material(s) for accommodating battery cell swelling. The compliant material may include polyurethane foam or silicone foam, for example. However, other materials or combinations of materials could be utilized to provide the cell expansion pads 48 with compliant properties within the scope of this disclosure.

Each cross-member beam 38 may include a beam body 74 and one or more reinforcement sections. In the illustrated embodiment, the cross-member beam 38 includes an upper or first reinforcement section 76 and a lower or second reinforcement section 78. However, other configurations are also contemplated within the scope of this disclosure.

The beam body 74 may be a unitary structure that includes an upper portion 83, a lower portion 82, and a mid-portion 84 extending between and connecting the upper portion 83 and the lower portion 82. The upper portion 83 may establish an upper plateau 86 of the cross-member beam 38, and the lower portion 82 may establish a lower base 88 of the cross-member beam 38. When positioned within the enclosure assembly 24 of the traction battery pack 18 in the manner shown in FIG. 3, the upper plateau 86 may interface with the enclosure cover 26, and the lower base 88 may interface with the heat exchanger plate 44 or the enclosure tray 28.

The beam body 74 of each cross-member beam 38 may be made of any suitable thermoplastic material. In an embodiment, the beam body 74 is overmolded about each of the first reinforcement section 76 and the second reinforcement section 78. The first reinforcement section 76 may therefore extend inside the upper portion 83 of the beam body 74, and the second reinforcement section 78 may extend inside the lower portion 82 of the beam body 74. The first and second first reinforcement sections 76, 78 may therefore be positioned to structurally reinforce select portions (e.g., stress areas) of the beam body 74.

In an embodiment, the beam body 74, the first reinforcement section 76, and the second reinforcement section 78 each include substantially equivalent lengths. In other implementations, the length of the beam body 74 may be greater than the respective lengths of the first and second first reinforcement sections 76, 78.

In an embodiment, the first and second first reinforcement sections 76, 78 are pultrusions, which implicates structure to these beam-like sections. A person of ordinary skill in the art having the benefit of this disclosure would understand how to structurally distinguish a pultruded beam structure from another type of structure, such as an extruded beam, for example.

The first and second first reinforcement sections 76, 78 may be manufactured as part of a pultrusion process that utilizes a glass or carbon fiber (unidirectional or multidirectional mat) and a thermoset resin. A plurality of glass or carbon fiber strands may be pulled through the thermoset resin as part of the pultrusion process for manufacturing the first and second first reinforcement sections 76, 78. The first and second first reinforcement sections 76, 78 may then be overmolded by the beam body 74 to provide a desired cross-section of the cross-member beam 38. The beam body 74 may be made of any suitable thermoplastic material.

Each cross-member beam 38 of the cell stack 22 may include a plurality of vent openings 56 for communicating battery cell vent byproducts through the beams and into one of the passageways 42 (note that the passageway 42 is best shown in FIG. 3). The vent openings 56 thus provide a path for battery cell vent byproducts to move through the cross-member beams 38 and into the passageways 42 as required during a venting event.

The vent openings 56 may be formed through the beam body 74 of the cross-member beam 38. In an embodiment, the vent openings 56 are formed through the mid-portion 84 of the beam body 74. When the battery cells 32 of the cell stack 22 are not venting, the vent openings 56 may be covered, such as by a sectioned membrane 55 (see FIG. 3). A pressure differential increase associated with one or more of the battery cells 32 venting can rupture a local section of the sectioned membrane 55, thereby allowing the battery cell vent byproducts to pass through the vent openings 56 for a single cell packet 46 experiencing a thermal event into the passageway 42. The local sections of the sectioned membrane 55 may locally break away when the single cell packet 46 experiences the thermal event to release the battery cell vent byproducts into the passageway 42. The battery cell vent byproducts may exit on both sides of the cell stack 22 from one cell packet 46.

Each cross-member beam 38 may additionally include a plurality of cell tab openings 60 arranged vertically below the vent openings 56. The cell tab openings 60 may be formed through the beam body 74. In an embodiment, the cell tab openings 60 are formed through the mid-portion 84 of the beam body 74.

Each cell tab opening 60 may be configured to accommodate a cell tab terminal 62 of the battery cells 32. The cell tab terminals 62 extend from a battery cell housing. An aluminum film may provide the battery cell housing, for example.

In an embodiment, each cell tab opening 60 may accommodate one cell tab terminal 62. In another embodiment, each cell tab opening 60 may be sized to receive cell tab terminals 62 from multiple adjacent battery cells 32. Battery vent byproducts may at least partially vent through each cell tab opening 60 in addition to the vent openings 56 during thermal events.

The cell stack 22 may additionally include one or more high voltage terminals 58. The high voltage terminal 58 may be mounted to one of the cross-member beams 38 of the cell stack 22 and may further be connected to one or more cell tab terminals 62 of the cell stack 22.

Each high voltage terminal 58 may include a base portion 66 and an electrical contact portion 68. The base portion 66 may be mounted to a portion of the cross-member beam 38, such as to the beam body 74, for example, and the electrical contact portion 68 may extend at a transverse angle away from the base portion 66 (e.g., in a direction away from the cell packets 46 of the cell stack 22). As further discussed below, the high voltage terminal 58 may establish part of an electrical connection system for electrically connecting the cell stack 22 to an adjacent cell stack of the traction battery pack 18.

In an embodiment, the high voltage terminal 58 is made of a metallic material, such as copper, aluminum, or brass, for example. However, additional materials or combinations of materials could be utilized to construct the high voltage terminals 58 within the scope of this disclosure.

Figures 5, 6:
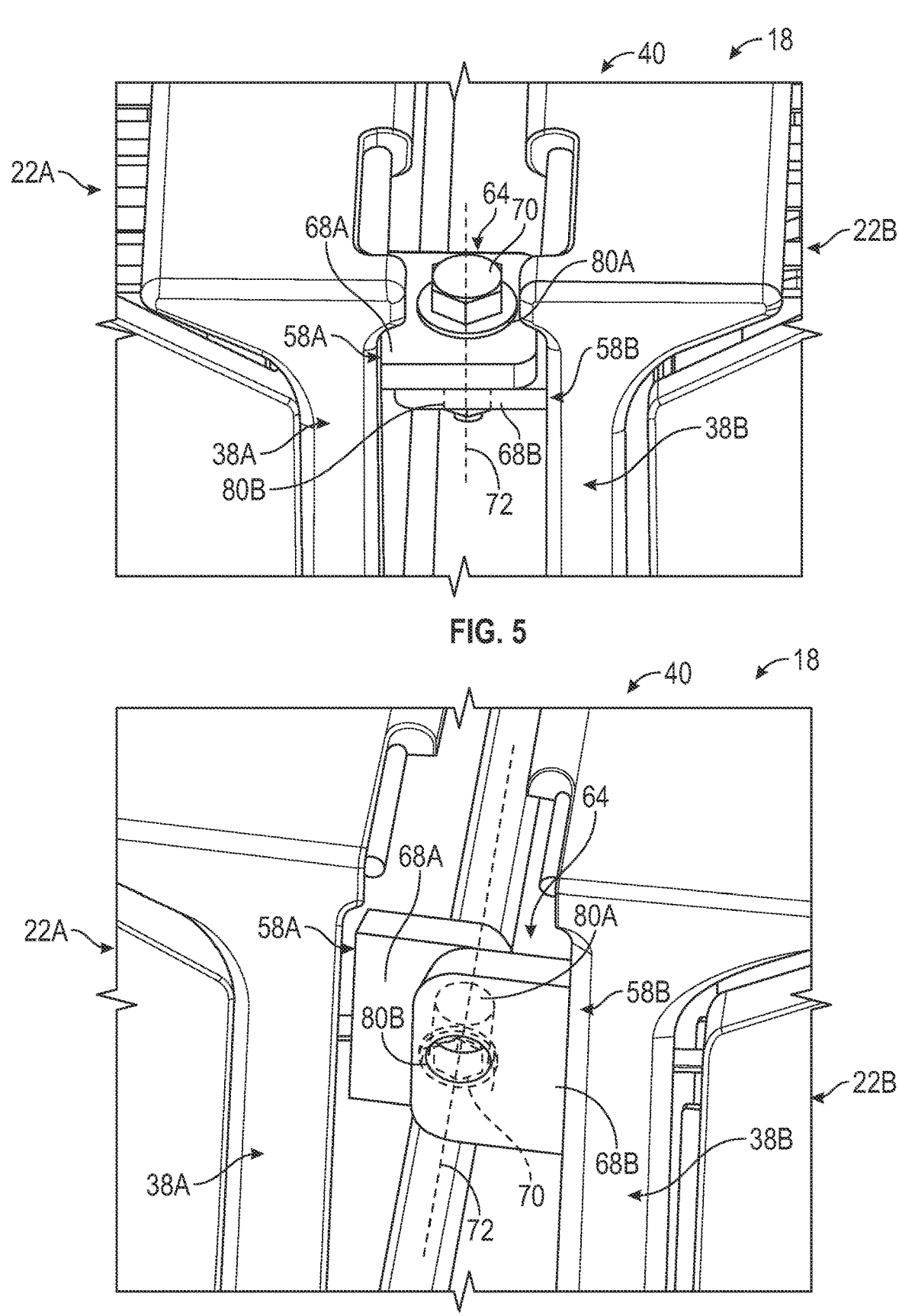
FIG. 5 illustrates an exemplary electrical connection system for connecting adjacent cell stacks of a traction battery pack.
FIG. 6 illustrates another exemplary electrical connection system for connecting adjacent cell stacks of a traction battery pack.

FIG. 5, with continued reference to FIGS. 1-4, illustrates an electrical connection system 64 for electrically connecting a first cell stack 22A and an adjacent second cell stack 22B of the traction battery pack 18. The electrical connection system 64 may connect the first and second cell stacks 22A, 22B in either a series string configuration or a parallel string configuration. Although a single electrical connection system 64 is illustrated in FIG. 5, the traction battery pack 18 could include a plurality of electrical connection systems for achieving the necessary voltage and power levels for supporting electric propulsion of the electrified vehicle 10.

The electrical connection system 64 may be established by a first high voltage terminal 58A of the first cell stack 22A, a second high voltage terminal 58B of the second cell stack 22B, and a mechanical fastener 70 that joins the first high voltage terminal 58A to the second high voltage terminal 58B. The second high voltage terminal 58B may have the same polarity (e.g., for a parallel string configuration) or a different polarity (e.g., for a series string configuration) as the first high voltage terminal 58A.

The first high voltage terminal 58A may be connected to a first cross-member beam 38A of the first cell stack 22A, and the second high voltage terminal 58B may be connected to a second cross-member beam 38B of the second cell stack 22B. The first cross-member beam 38A and the second cross-member beam 38B may establish one of the cross-member assemblies 40 of the traction battery pack 18.

The first cell stack 22A and the second cell stack 22B may be positioned adjacent to one another within the traction battery pack 18 such that a first electrical contact portion 68A of the first high voltage terminal 58A and second electrical contact portion 68B of the second high voltage terminal 58B are arranged side-by-side relative to one another along an axis 72. In an embodiment, the axis 72 is a vertical axis (see FIG. 5). In another embodiment, the axis 72 is a horizontal axis that can extend in parallel with a cross-vehicle direction (see FIG. 6).

The first electrical contact portion 68A may include a first aperture 80A, and the second electrical contact portion 68B may include a second aperture 80B. The first aperture 80A and the second aperture 80B may be coaxially aligned along the axis 72 when the first and second cell stacks 22A, 22B are positioned next to one another.

The mechanical fastener 70 may be received through the first aperture 80A and the second aperture 80B to join the first electrical contact portion 68A and the second electrical contact portion 68B. In an embodiment, the mechanical fastener 70 is a bolt and nut assembly. However, other mechanical fasteners, including welds, for example, could be used to join the first electrical contact portion 68A and the second electrical contact portion 68B.

The first electrical contact portion 68A may be joined to the second electrical contact portion 68B after positioning the first cell stack 22A and the second cell stack 22B into the enclosure assembly 24. Proper alignment of the first electrical contact portion 68A to the second electrical contact portion 68B can facilitate reliable assembly of the electrical connector system 64.

Figure 7A:
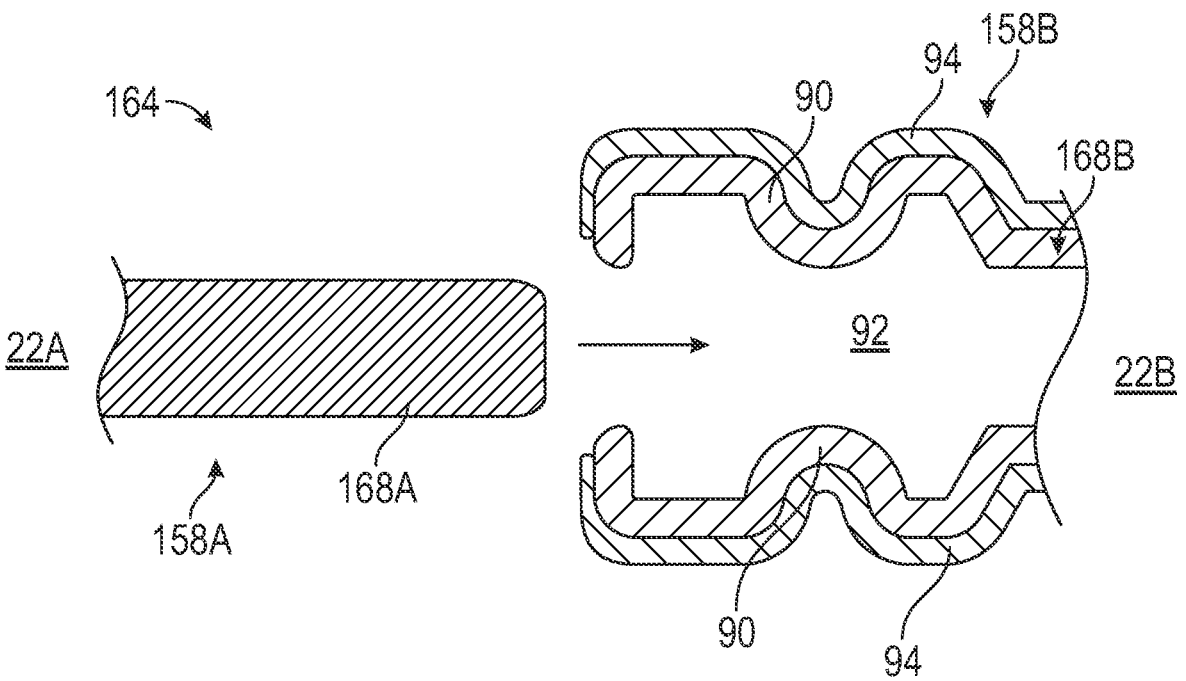
FIGS. 7A and 7B illustrate another exemplary electrical connection system for connecting adjacent cell stacks of a traction battery pack.
Figure 7B:
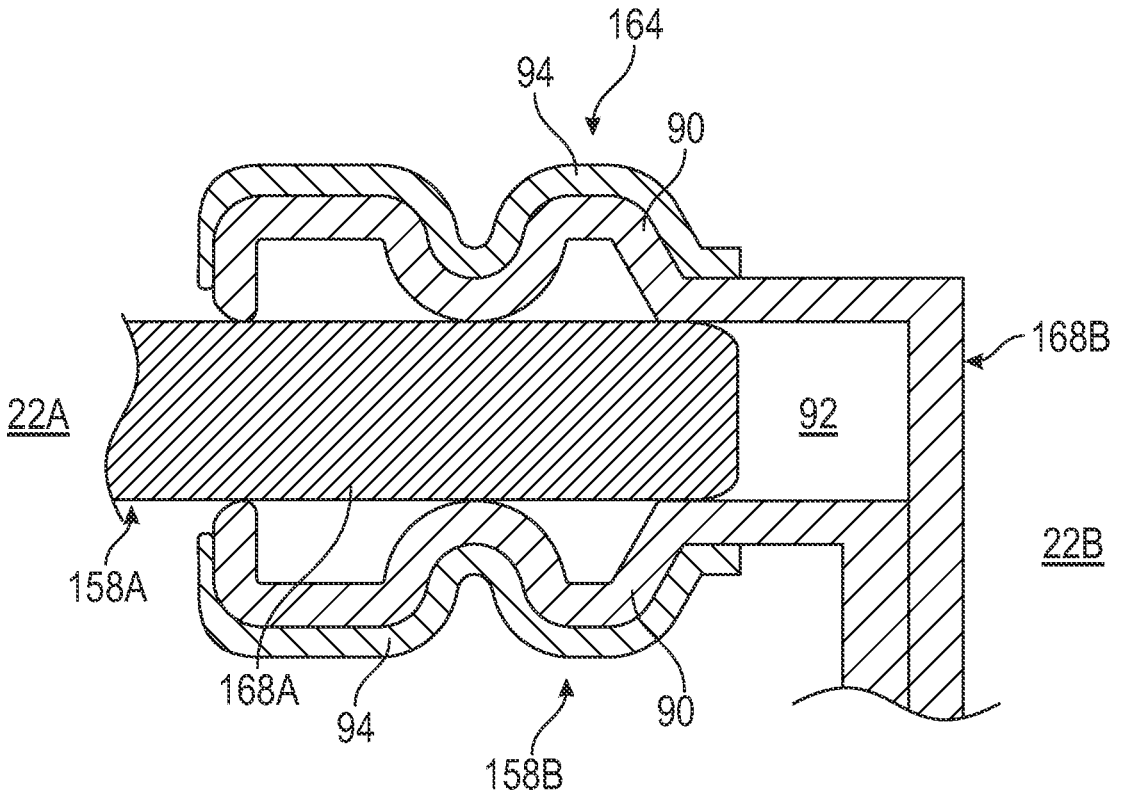

FIGS. 7A and 7B illustrates another exemplary electrical connection system 164 for electrically connecting a first cell stack 22A and an adjacent second cell stack 22B of the traction battery pack 18. The electrical connection system 164 may be established by a first high voltage terminal 158A of the first cell stack 22A and a second high voltage terminal 158B of the second cell stack 22B. FIG. 7A shows the electrical connection system 164 prior to joining the first and second high voltage terminals 158A, 158B, and FIG. 7B shows the electrical connection system 164 after joining the first and second high voltage terminals 158A, 158B.

In this implementation, the electrical connection system 164 may provide a plug-in design in which a first electrical contact portion 168A of the first high voltage terminal 158A is configured as a male portion that can plug into a female portion provided by a second electrical contact portion 168B of the second high voltage terminal 158B. The first electrical contact portion 168A may be joined to the second electrical contact portion 168B as the first cell stack 22A is moved into position relative to the second cell stack 22B.

The second electrical contact portion 168B may include a pair of spaced apart arms 90. A slot 92 may extend between the spaced apart arms 90. The slot 92 provides an open space for receiving the first electrical contact portion 168A in order to establish the electrical connection system 164.

Each spaced apart arm 90 may include an outer coating 94. The outer coating 94 may protect portions of the electrical connection system 164 during and after assembly.

Figure 8:
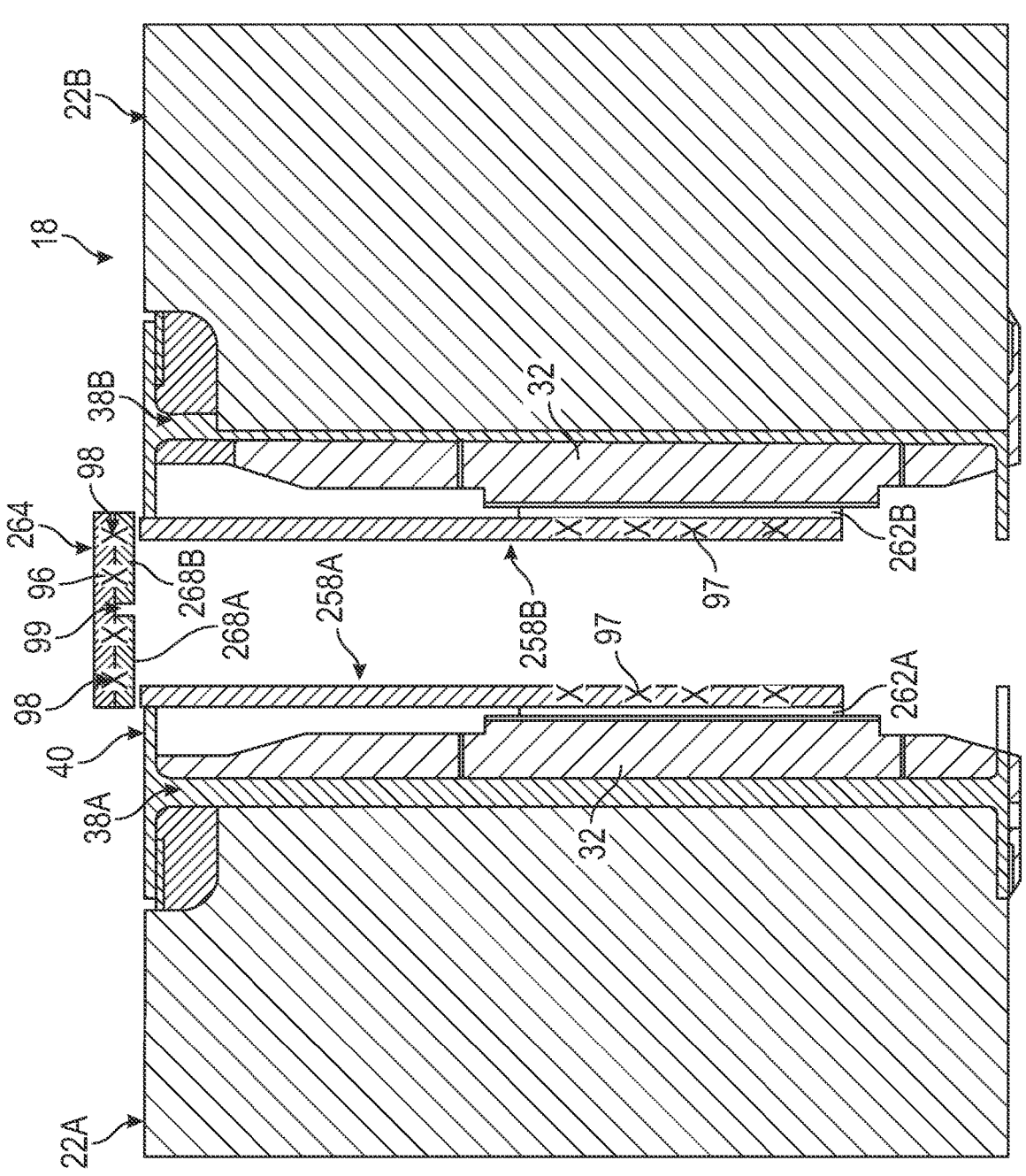
FIG. 8 illustrates yet another electrical connection system for connecting adjacent cell stacks of a traction battery pack.

FIG. 8 illustrates yet another exemplary electrical connection system 264 for electrically connecting a first cell stack 22A and an adjacent second cell stack 22B of the traction battery pack 18. The electrical connection system 264 may be established by a first high voltage terminal 258A of the first cell stack 22A, a second high voltage terminal 258B of the second cell stack 22B, a bus bar 96, and a mechanical fastener 98 that joins the bus bar 96 to the first high voltage terminal 258A and the second high voltage terminal 258B.

The first high voltage terminal 258A may be connected to a first cell tab terminal 262A of the first cell stack 22A, and the second high voltage terminal 258B may be connected to a second cell tab terminal 262B of the second cell stack 22B. Weld beads 97 may be used to connect the first high voltage terminal 258A to the first cell tab terminal 262A and the second high voltage terminal 258B to the second cell tab terminal 262B.

The first high voltage terminal 258A may include a first electrical contact portion 268A, and the second high voltage terminal 258B may include a second electrical contact portion 268B. The first electrical contact portion 268A and the second electrical contact portion 268B may be arranged adjacent to one another a location that is vertically above a first cross-member beam 38A of the first cell stack 22A and a second cross-member beam 38B of the second cell stack 22B. Together, the first and second cross-member beams 38A, 38B may establish a cross-member assembly 40 of the traction battery pack 18.

The first electrical contact portion 268A and the second electrical contact portion 268B may establish a relatively flat interface 99 for receiving the bus bar 96 thereon. The bus bar 96 may be secured to each of the first electrical contact portion 268A and the second electrical contact portion 268B by the mechanical fastener 98.

The electrical connections systems of this disclosure are capable of reliably connecting battery cell stacks of a traction battery pack. The electrically connection systems allow for various implementations including vertically stacked connections, horizontal stacked connections, plug-in connections, connections that do not rely on bus bars, connections that rely on bus bars, etc.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
   a first cell stack including a first cross-member beam;
   a first high voltage terminal mounted to the first cross-member beam;
   a second cell stack including a second cross-member beam;
   a second high voltage terminal mounted to the second cross-member beam;
   the first cross-member beam and the second cross-member beam are immediately adjacent and form a cross-member assembly disposed between the first cell stack and the second cell stack; and
   wherein the first high voltage terminal and the second high voltage terminal are directly joined to one another at the cross-member assembly to electrically connect the first cell stack and the second cell stack.

2. The traction battery pack as recited in claim 1, wherein a mechanical fastener couples the first high voltage terminal to the second high voltage terminal.

3. The traction battery pack as recited in claim 2, wherein the first high voltage terminal includes a first electrical contact portion and the second high voltage terminal includes a second electrical contact portion arranged side-by-side to the first electrical contact portion along a vertical axis, and further wherein the mechanical fastener extends along the vertical axis to couple the first high voltage terminal to the second high voltage terminal.

4. The traction battery pack as recited in claim 2, wherein the first high voltage terminal includes a first electrical contact portion and the second high voltage terminal includes a second electrical contact portion arranged side-by-side to the first electrical contact portion along a horizontal axis, and further wherein the mechanical fastener extends along the horizontal axis to couple the first high voltage terminal to the second high voltage terminal.

5. The traction battery pack as recited in claim 1, wherein a weld bead or a bus bar couples the first high voltage terminal to the second high voltage terminal.

6. The traction battery pack as recited in claim 1, wherein the first high voltage terminal includes a male portion configured to engage a female portion of the second high voltage terminal to electrically connect the first cell stack and the second cell stack.

7. The traction battery pack as recited in claim 6, wherein the female portion includes a first arm, a second arm, and a slot extending between the first arm and the second arm, and further wherein the male portion is received within the slot to electrically connect the first cell stack and the second cell stack.

8. The traction battery pack as recited in claim 1, comprising a venting passageway disposed between the first cross-member beam and the second cross-member beam, wherein an enclosure cover provides a vertically upper side of the venting passageway, and an enclosure tray or a heat exchanger plate provides a vertically lower side of the venting passageway.

9. The traction battery pack as recited in claim 8, wherein a vent opening formed through the first cross-member beam establishes a venting path between the first cell stack and the venting passageway.

10. The traction battery pack as recited in claim 1, wherein the first cell stack includes a plurality of battery cells supported between the first cross-member beam and a third cross-member beam, and the second cell stack includes another plurality of battery cells supported between the second cross-member beam and a fourth cross-member beam.

11. The traction battery pack as recited in claim 1, wherein the first high voltage terminal includes a base portion mounted to the first cross-member beam and an electrical contact portion that extends at a transverse angle away from the base portion.

12. The traction battery pack as recited in claim 1, wherein the first high voltage terminal includes a first electrical contact portion having a first aperture and the second high voltage terminal includes a second electrical contact portion having a second aperture that is coaxially aligned with the first aperture.

13. The traction battery pack as recited in claim 1, wherein the first cross-member beam and the second cross-member beam each include a beam body and a reinforcement section that extends inside the beam body.

14. The traction battery pack as recited in claim 13, wherein the reinforcement section includes a pultrusion.

15. The traction battery pack as recited in claim 13, wherein the beam body includes a cell tab opening sized to receive a tab terminal of a battery cell of the first cell stack or the second cell stack.

16. The traction battery pack as recited in claim 10, wherein the plurality of battery cells of the first cell stack are stacked horizontally between the first cross-member beam and the third cross-member beam and longitudinally between a first compression plate and a second compression plate.

17. A traction battery pack, comprising:
a first cell stack;
a second cell stack;
a cross-member assembly arranged between the first cell stack and the second cell stack and including a first cross-member beam of the first cell stack and a second cross-member beam of the second cell stack; and
an electrical connection system located at the cross-member assembly and configured to electrically connect the first cell stack and the second cell stack, the electrical connection system including:
a first high voltage terminal mounted to the first cross-member beam, a second high voltage terminal mounted to the second cross-member beam, and a mechanical fastener that joins the first high voltage terminal and the second high voltage terminal by extending through coaxially aligned apertures of the first and second high voltage terminals to directly join them at the cross-member assembly.

18. The traction battery pack as recited in claim 17, wherein the mechanical fastener includes a weld bead, wherein the weld bead joins a bus bar to the first high voltage terminal and the second high voltage terminal.

19. The traction battery pack as recited in claim 17, wherein the mechanical fastener includes a bolt and nut assembly.

20. A traction battery pack, comprising:
a first cell stack including a first plurality of battery cells;
a second cell stack including a second plurality of battery cells;
a cross-member assembly arranged between the first cell stack and the second cell stack and including a first cross-member beam of the first cell stack and a second cross-member beam of the second cell stack;
the first cross-member beam includes a first plurality of cell tab openings sized to receive tab terminals of the first plurality of battery cells, and the second cross-member beam includes a second plurality of cell tab openings sized to receive tab terminals of the second plurality of battery cells; and
an electrical connection system located at the cross-member assembly and configured to electrically connect the first cell stack and the second cell stack, the electrical connection system including:
a first high voltage terminal mounted to a first surface of the first cross-member beam, the first surface facing toward the second cross-member beam;
a second high voltage terminal mounted to a second surface of the second cross-member beam, the second surface facing toward the first cross-member beam;
wherein a first aperture of the first high voltage terminal is coaxially aligned with a second aperture of the second high voltage terminal when the first and second cross-member beams are arranged immediately adjacent one another to establish the cross-member assembly; and a bolt and nut assembly extending through the coaxially aligned first and second apertures along a fastening axis to directly join the first high voltage terminal and the second high voltage terminal at the cross-member assembly and establish an electrical connection between the first cell stack and the second cell stack.

* * * * *